United States Patent [19]

Steuerwald

[11] 3,844,095
[45] Oct. 29, 1974

[54] MOWER GUARD
[75] Inventor: Wilfred Lee Roy Steuerwald, Ottumwa, Iowa
[73] Assignee: Deere & Company, Moline, Ill.
[22] Filed: May 25, 1973
[21] Appl. No.: 363,893

[52] U.S. Cl. .............................................. 56/310
[51] Int. Cl............................................ A01d 55/10
[58] Field of Search...... 56/296, 298, 305, 307–310, 56/311

[56] References Cited
UNITED STATES PATENTS

| 94,826 | 9/1869 | Hull | 56/310 |
|---|---|---|---|
| 475,118 | 5/1892 | Jones | 56/310 |
| 572,728 | 12/1896 | Shepherd | 56/310 |
| 1,610,401 | 12/1926 | Ward | 56/310 |
| 2,619,787 | 12/1952 | Mills et al. | 56/310 |
| 3,224,179 | 12/1965 | Schuman | 56/310 |
| 3,553,948 | 1/1971 | White | 56/307 |

Primary Examiner—Russell R. Kinsey

[57] ABSTRACT

A mower includes an elongated, horizontal, transversely extending support member having a plurality of mower guards removably attached to and extending forwardly therefrom. Each mower guard includes a pair of fore-and-aft extending guard elements having pointed forward ends and horizontal slots extending transversely through the upper central portions of the guard element. The rearward ends of the guard elements are connected by a transverse rib, and a trash bar extends parallel to and forwardly of the rib and includes a central portion between the guard elements and outer portions extending outwardly from the outer sides of the guard elements. The lower sides of the slots are machined to form generally fore-and-aft cutting edges on opposite sides of each guard element and the top surface of the trash bar immediately adjacent and on opposite sides of the guard elements is also machined to form transversely extending cutting edges extending outwardly from the rearward ends of the fore-and-aft cutting edges. A transversely reciprocating sickle bar is slidably mounted on the machined surface and includes a plurality of sickle sections having forwardly converging cutting edges that register with the mower-guard cutting edges as the sickle bar reciprocates.

2 Claims, 6 Drawing Figures

MOWER GUARD

BACKGROUND OF THE INVENTION

This invention relates to a reciprocating sickle-bar-type mower, and more particularly to an improved mower guard for use in such a mower.

It is well known to provide finger-type guards for the sickle bar on such reciprocating mowers, wherein the sickle bar reciprocates in a horizontal slot in the mower guard. Generally, ledger plates with converging cutting edges on opposite sides of the ledger plate are mounted on the guard, the sickle cutting edges registering with the ledger plate cutting edges to shear the crop as the machine advances, although it is known to machine the stationery cutting edges directly on the mower guard. In such mower guards, it is further known to make the mower guard by means of a forging process, such as described in U.S. Pat. No. 2,619,787, the slot being machined into the mower guard after the forging process to form the cutting edges directly on the mower guard, the parting line of the forging lying within the slot so that the parting line is partially machined away. It is further known to provide a transversely extending trash bar between the adjacent fingers below the sickle bar, the forward edge of the trash bar being slightly ahead of the rearward intersection of the converging cutting edges of the adjacent sickle bar sections, so that the trash bar keeps the standing crop out of the intersection between the cutting edges and forces it against the shearing edges of the mower guard. The trash bar also deflects trash and dirt below the sickle bar. A mower guard with a trash bar is described in U.S. Pat. No. 3,553,948, and, as described in said patent, the upper surface of the trash bar is conventionally below the machined cutting surface of the mower guard.

SUMMARY OF THE INVENTION

According to the present invention, there is provided an improved mower guard of the above general type wherein each mower guard finger has a machined surface forming generally fore-and-aft cutting edges on opposite sides of the mower guard finger and a trash bar extending between adjacent mower guard fingers below the sickle bar, at least a portion of the trash bar being raised so that the upper surface of the raised portion is machined coplanar with the cutting surface on the mower guard finger, providing cutting edges along the forward side of the trash bar extending laterally outwardly from the rearward ends of the fore-and-aft cutting edges on the mower bar fingers. The cutting edges on the forward side of the trash bar also register with the sickle section cutting edges to increase the cutting area and improve the cutting action of the mower.

Another feature of the invention resides in the fact that the parting line of the forged mower bar that normally runs through the trash bar is raised, and is machined off when the cutting surface is machined on the top of the trash bar.

DESCRIPTION OF THE PREFERRED EMBODIMENT

Figure 1:
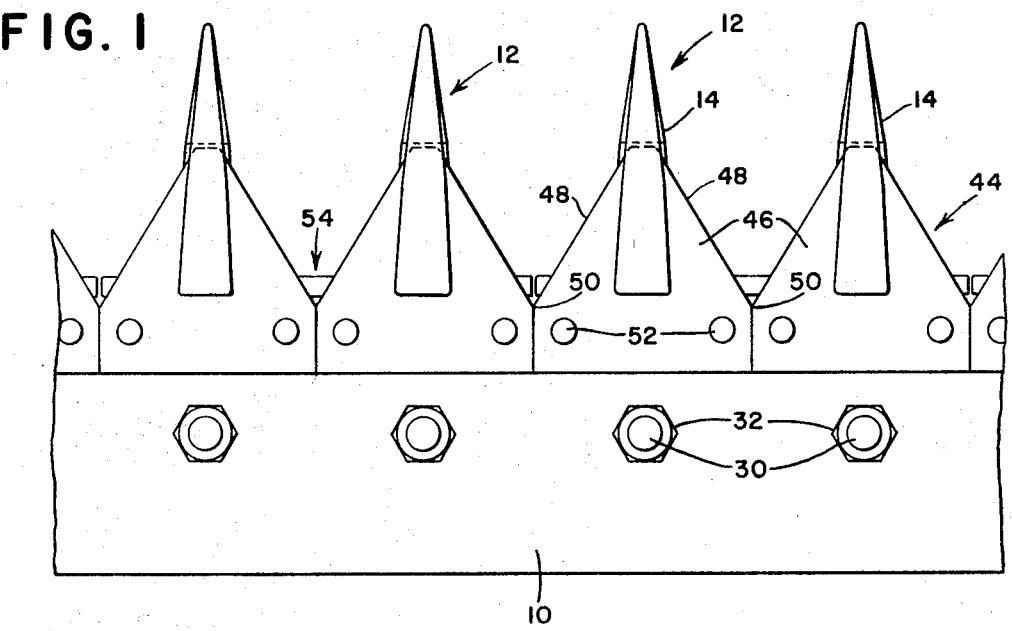
FIG. 1 is a plan view of a section of a mower embodying the invention.

The invention is embodied in a reciprocating sickle-bar-type mower having an elongated, normally horizontal support bar 10 extending transversely of the direction of travel of the machine, only a short section of the support bar 10 being shown in FIG. 1. A plurality of mower guards, indicated generally by the numeral 12, are mounted side-by-side on the support bar and extend forwardly therefrom. The mower guards 12 in the illustrated embodiment are double guards, and include a pair of transversely spaced generally fore-and-aft guard elements or fingers 14.

Each guard element includes opposite sides 15 and a tapered front portion 16 terminating at a pointed forward end 18. The guard element has a curved bottom or sole surface 20 extending downwardly and rearwardly from the forward end to a heel portion 22 at the rearward end of the guard element. A vertical bolt hole 24 extends downwardly through the heel portion 22, and the heel portion has a flat upper surface 26 which seats against the flat underside of the support bar 10. An abutment 28 extends upwardly from the surface 26 and the forward portion of the support bar 10 seats against the abutment 28. A bolt 30 has its head end on the bottom side of the guard element and extends upwardly through the bolt hole 24, and a nut 32 is threaded on the bolt to releasably fasten the guard element to the underside of the support bar 10. The heel portions 22 of the two guard elements 14 in the illustrated embodiment are connected by a transverse rib 34.

Figure 2:
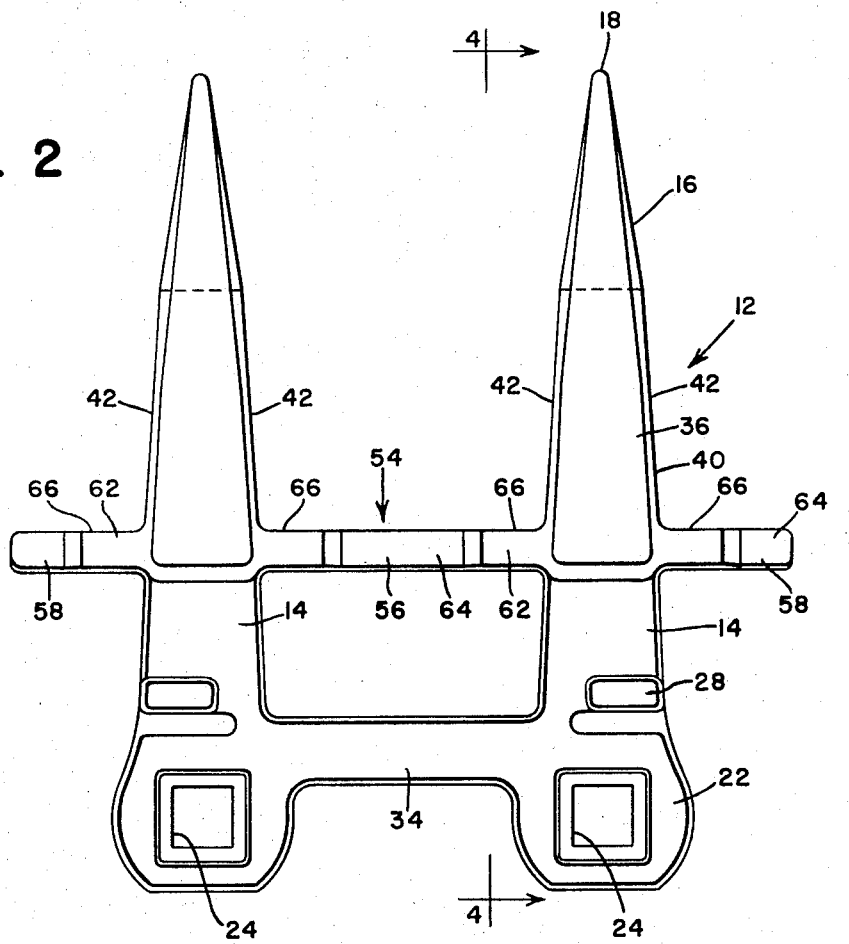
FIG. 2 is an enlarged plan view of an improved mower guard embodying the invention.

Each guard element 14 has a rearwardly extending lip 36 at the upper central portion of the guard element, the space between the lip 36 and the remainder of the guard element defining a horizontal slot 38 extending transversely through the guard element. A horizontal ledger surface 40 is machined on the bottom side of each slot 38 and defines generally fore-and-aft cutting edges 42 at the intersection of the ledger surface 40 with the opposite sides of the guard element. As best seen in FIG. 2, the sides of the guard element adjacent the slotted area converge slightly so that the cutting edges 42 are only approximately fore-and-aft and are inclined slightly inwardly in a forward direction, the ledger surface 40 on the guard element being somewhat trapezoidal in shape.

A sickle bar assembly, indicated generally by the numeral 44, has its forward portion mounted for transverse reciprocation within the slots 38 on top of the ledger surface 40, the rearward portion of the sickle bar assembly 44 being supported on the support bar 10 in the known manner. Conventionally, hold-down clips (not shown) are attached to the support bar at intervals and overlie the sickle bar assembly to hold the sickle bar against the ledger surfaces of the guards. The sickle bar assembly 44 includes a plurality of horizontal, generally triangular sickle sections 46 mounted side-byside on an elongated sickle bar (not shown), the rearward or base end of the sections being disposed side-by-side with the forward vertices of the sickle bar sections being spaced the same distance apart as the guard elements 14 and being disposed at the forward ends of the slots 38. Each sickle bar section 46 has inclined forwardly converting cutting edges 48 on its opposite sides, the cutting edges 48 of adjacent sections 46 intersecting at rear vertices 50. The individual sickle bar sections 46 are attached to the sickle bar by rivets 52 and are individually replaceable in the known manner.

Each mower guard 12 includes an elongated, transversely extending trash bar, indicated generally by the numeral 54, the trash bar of each mower guard being aligned with and abutting the trash bar of the adjacent guard. The trash bar is disposed parallel to and forwardly of the rib 34 below the sickle bar 54 and includes a central portion 56 extending between the two guard elements 14 and outer portions 58 extending outwardly from opposite sides of the mower guard. The trash bar has a downwardly and rearwardly curved front side 60 and a machined top surface 62 coplanar with the ledger surfaces 40, the top surface extending laterally from the rearward ends of the ledger surfaces 40, so that the ledger surface 40 and the top surface 62 for each guard element form a generally T-shaped surface. In the illustrated embodiment, recessed areas 64 are provided on the top surface at the opposite ends of the outer portions 58 and in the center of the central portion 56 below the level of the top surface 62, although the machined surface 62 does extend from the opposite side of each guard element. Of course, the recessed areas could be omitted and the top surface 62 coplanar with the ledger surfaces 40 could be provided on top of the entire trash bar 54. The intersection of the top surface 62 with the front side 60 of the trash bar provides transversely extending cutting edges 66 extending outwardly from the opposite side cutting edges 42. Thus, each guard element has generally L-shaped cutting edges on opposite sides of the guard element formed by the fore-and-aft cutting edges 42 and the transverse cutting edges 66.

Figure 3:
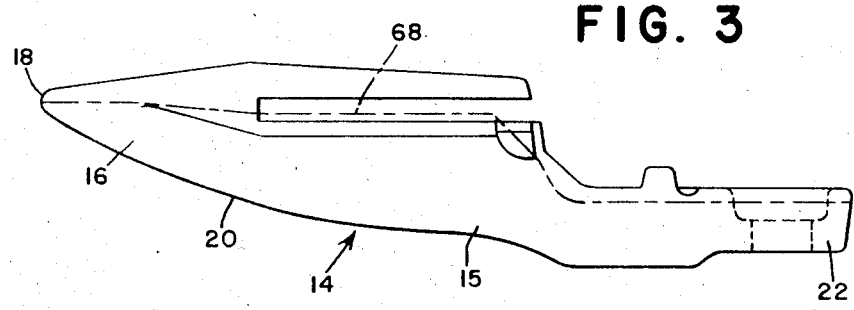
FIG. 3 is a side elevation view of the mower guard.

As previously described, the ledger surfaces 40 and the top surface 62 on the trash bar are machined, the mower guard being forged following the general procedure described in U.S. Pat. No. 2,619,787. The parting line of the forging is indicated by the dashed line 68 in FIG. 3, and, as is apparent, the parting line is disposed in the machined slot 38 and is inclined downwardy and rearwardly through the trash bar. Since the top of the trash bar, as well as the slot, is machined, the parting line on the trash bar is removed as well as on the slot, at least in the machined area.

While a double finger mower guard 12 is shown in the illustrated embodiment, it is apparent that three or more guard elements could be provided on the guard, in which case additional central portions 56 for the trash bar 54 would be provided interconnecting the adjacent guard elements of the guard. Also, the mower guard could be made with only a single guard element or finger 14 in which case the central portion of the trash bar would be omitted, and the trash bar would consist only of the two outer portions 58 projecting outwardly from opposite sides of the guard element, the important feature being the L-shaped cutting edge integral with and on opposite sides of each guard element.

Figure 4:
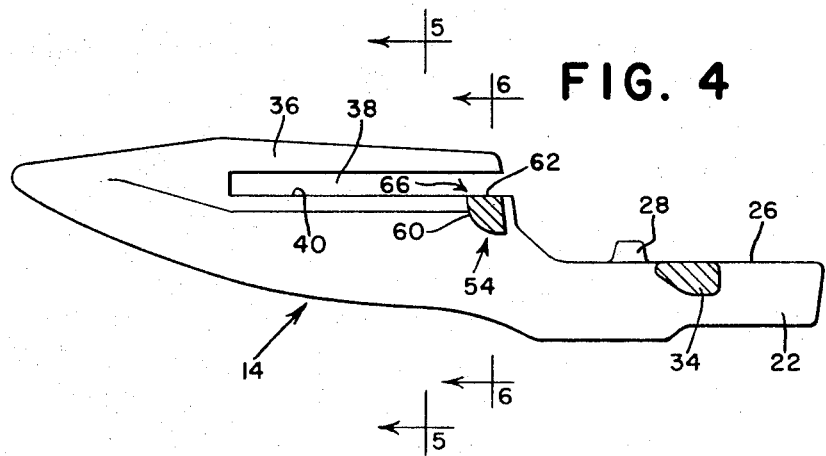
FIG. 4 is a vertical section through the mower guard generally along the line 4—4 of FIG. 2.
Figure 5:
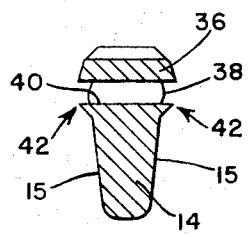
FIG. 5 is a vertical transverse section as viewed along the line 5—5 of FIG. 4.
Figure 6:
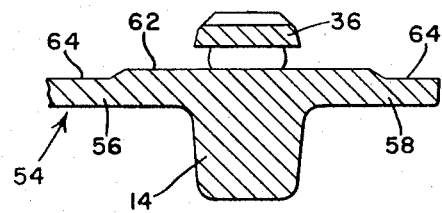
FIG. 6 is a vertical transverse section as viewed along the line 6—6 of FIG. 4.

In operation, the sickle bar 44 is transversely reciprocated as the mower advances in the known manner, approximately a 3-inch spacing being provided between the centerline of adjacent guard elements and the sickle bar reciprocating approximately 3 inches so that each sickle section moves from a centered position on one guard element, as shown in FIG. 1, to a centered position on the adjacent guard element and then back. As is apparent, the front side 60 of the trash bar 54 is disposed ahead of the rear vertices 50 between adjacent sickle sections, so that the cutting edges 48 register with the transverse cutting edge 66 on the forward end of the trash bar before it registers with the generally fore-and-aft cutting edge 42 on the guard element, thereby increasing the cutting area and providing a more efficient cutting. As best seen in FIG. 4, the front side of the trash bar is inclined downwardly and rearwardly as a result of the foregoing draft, which provides an effective cutting edge 66 on the top surface of the trash bar once the trash bar is machined. As previously described, the raising of the trash bar adjacent the opposite sides of the guard element so that the top surface is machined off, also results in the machining off of the parting line, which previously had created a ledge or step on the side cutting edge at the parting line.

I claim:

1. In a mower having an elongated generally horizontal support member, and an elongated longitudinally reciprocating sickle bar assembly including a plurality of sickle sections with angled, forwardly converging cutting edges, each cutting edge intersecting with a cutting edge on the adjacent section at a rearward vertex, the combination therewith of a plurality of improved mower guards mounted on and extending forwardly from the support member and having cutting edges registering with the cutting edges of the sickle sections as the sickle bar reciprocates, each mower guard being made of forged steel and comprising: at least one fore-and-aft guard element having a tapered front portion, opposite lateral sides, and a rearward heel portion, attachable to the support member; a transversely extending trash bar means including portions extending laterally outwardly from opposite sides of each guard element; and a generally horizontal machined cutting surface extending across an upper central portion of each mower guard element and at least part of the trash bar portions adjacent the opposite side of the guard element and forming generally fore-and-aft cutting edges at the intersection of the cutting surface with the mower guard sides and generally transverse cutting edges extending outwardly from the rearward ends of the side cutting edges at the intersection of the cutting surface with the forward side of the trash bar portions, the sickle sections being mounted for reciprocation on the cutting surface with the rearward vertex between the cutting edges of two adjacent sickle disposed rearwardly of the cutting edges so that the sickle section cutting edges register with the guard element cutting edges as the sickle bar reciprocates, the mower guard having a forging parting plane forming parting lines at the intersection with the outer surfaces of the guard and having a generally horizontal portion disposed closely above the cutting surface, so that the portion of the parting lines above the cutting surface is removed when the cutting surface is machined, and a downwardly, and rearwardly inclined portion extending downwardly through the top of the trash bar, so that the parting lines on the machined areas on the top of the trash bar are also removed, whereby the parting lines do not intersect the cutting edges.

2. The invention defined in claim 1 wherein a plurality of guard elements are provided each mower guard, the guard elements being interconnected adjacent their rearward ends by a transversely extending rib means, and the trash bar means interconnects the guard elements forwardly of the rib means and includes at least one central portion between adjacent guard elements and outer portions extending outwardly from the outer sides of the opposite end of the guard elements.

* * * * *